United States Patent
Thamm et al.

(10) Patent No.: US 12,067,729 B2
(45) Date of Patent: Aug. 20, 2024

(54) METHOD AND SYSTEM FOR ANALYZING A PLURALITY OF INTERCONNECTED BLOOD VESSELS

(71) Applicant: Siemens Healthcare AG, Erlangen (DE)

(72) Inventors: Florian Thamm, Fuerth (DE); Markus Juergens, Adelsdorf (DE); Hendrik Ditt, Neustadt an der Aisch (DE)

(73) Assignee: Siemens Healthineers AG, Forchheim (DE)

( * ) Notice: Subject to any disclaimer, the term of this patent is extended or adjusted under 35 U.S.C. 154(b) by 298 days.

(21) Appl. No.: 17/477,894

(22) Filed: Sep. 17, 2021

(65) Prior Publication Data
US 2022/0101535 A1 Mar. 31, 2022

(30) Foreign Application Priority Data
Sep. 25, 2020 (EP) ..................... 20198496

(51) Int. Cl.
*G06T 7/162* (2017.01)
*G06T 7/11* (2017.01)
*G06T 7/37* (2017.01)

(52) U.S. Cl.
CPC ............. *G06T 7/162* (2017.01); *G06T 7/11* (2017.01); *G06T 7/37* (2017.01); *G06T 2207/30101* (2013.01); *G06T 2207/30204* (2013.01)

(58) Field of Classification Search
CPC ... G06T 7/11; G06T 7/162; G06T 7/37; G06T 2207/30204; G06T 2207/30101; A61B 8/13
See application file for complete search history.

(56) References Cited

U.S. PATENT DOCUMENTS

| 8,977,029 | B2* | 3/2015 | Du | G06T 7/11 |
| | | | | 382/131 |
| 10,582,907 | B2 | 3/2020 | Chen et al. | |
| 2014/0056501 | A1 | 2/2014 | Ditt et al. | |

FOREIGN PATENT DOCUMENTS

CN 106803251 A 6/2017

OTHER PUBLICATIONS

Majd Zreik et al: "Automatic Detection and Characterization of Coronary Artery Plaque and Stenosis using a Recurrent Convolutional Neural Network in Coronary CT Angiography"; arxiv.org, Cornell University Library; 201 Olin Library Cornell University Ithaca; NY 14853; XP080870084.

(Continued)

*Primary Examiner* — Tuan H Nguyen
(74) *Attorney, Agent, or Firm* — Harness, Dickey & Pierce, P.L.C.

(57) ABSTRACT

A method and system are for analyzing a plurality of interconnected blood vessels, preferably for providing output data for the analysis of a plurality of interconnected blood vessels, e.g. for vessel segmentation, vessel labeling, and vessel occlusion detection. The output data include a graphical representation of a vessel tree model of a patient. The method of an embodiment, in the most general terms includes receiving input data, e.g. via an interface; generating output data by applying algorithmic operations to the input data; and providing the output data, e.g. via an interface.

24 Claims, 4 Drawing Sheets

(56) References Cited

OTHER PUBLICATIONS

Edelman, R. Robert et al: "Noncontrast MR angiography: An update: Noncontrast MR Angiography"; Journal of Magnetic Resonance Imaging; vol. 49, No. 2, Dec. 19, 2018 (Dec. 19, 2018), pp. 355-373, XP55889359.
Passat, Nicolas et al: "Region-growing segmentation of brain vessels: An atlas-based automatic approach"; Journal of Magnetic Resonance Imaging; vol. 21, No. 6, May 19, 2005 (May 19, 2005), pp. 715-725, XP55124840.
Manniesing R. et al:"Level set based cerebral vasculature segmentation and diameter quantification in CT angiography",Medical Image Analysis 10 (2006) 200-214.
Shim H. etal.:"Robust segmentation of cerebral arterial segments by a sequential Monte Carlo method: Particle filtering", computer methods and programs in biomedicine 84 (2006) 135-145.
Python: History of the software, https://docs.python.org/3.7/license.html.
Kemmling A. et al.:"Decomposing the Hounsfield Unit Probabilistic Segmentation of Brain Tissue in Computed Tomography", Clin Neuroradiol (2012) 22:79-91, DOI 10.1007/s00062-011-0123-0.
Schellinger P. et al.:"Noninvasive Angiography (Magnetic Resonance and Computed Tomography) in the Diagnosis of Ischemic Cerebrovascular Disease",Cerebrovasc Dis 2007;24(suppl 1):16-23 DOI:0.1159/000107375.
Manniesing R. et a.:"Cerebral arteries: fully automated segmentation from CT angiography—a feasibility study", Radiology 247.3(2008), 841-846.
Iqbal S. et al.:"A Comprehensive Study of the Anatomical Variations of the Circle of Willis in Adult Human Brains", J Clin Diagn Res. Nov. 2013; 7(11): 2423-2427.
Forkert N.D. et al.:Generation of a Probabilistic Arterial Cerebrovascular Atlas Derived from 700 Time-of-Flight MRA Datasets, Quality of Life through Quality of Information, IOS Press, 2012.
Meijs M. et al.:"Robust Segmentation of the Full Cerebral Vasculature in 4D CT of Suspected Stroke Patients", published online 2017, www.nature.com/scientificreports.
Nazir A.:"OFF-eNET: An Optimally Fused Fully End-to-End Network for Automatic Dense Volumetric 3D Intracranial Blood Vessels Segmentation", d in: IEEE Transactions on Image Processing (vol. 29) (2020).
SciPy license, Copyright © 2001, 2002 Enthought, Inc., https://www.scipy.org/scipylib/license.html.
Li Wenqi et al.:"On the Compactness, Efficiency, and Representation of 3D Convolutional Networks: Brain Parcellation as a Pretext Task", arXiv:1707.01992v1 [cs.CV] Jul. 6, 2017.
NumPy License Copyright (c) 2005, NumPy Developers, https://numpy.org/doc/1.13/license.html.
Hernandez M. et al.:Non-parametric geodesic active regions: Method and evaluation for cerebral aneurysms segmentation in 3DRA and CTA2, Medical Image Analysis 11 (2007) 224-241.
Suran S. et al.:"Discovering Shortest Path between Points in Cerebrovascular System", Department of Computer Science and Engineering, SRM University, Chennai, India, (no publishing date).
Chen H. et al.:"VoxResNet: Deep Voxelwise Residual Networks for Volumetric Brain Segmentation", arXiv:1608.05895v1 [cs.CV] Aug. 21, 2016.
Dunas T.-et al.:"A Stereotactic Probabilistic Atlas for the Major Cerebral Arteries", Neuroinform (2017) 15:101-110,DOI 10.1007/s12021-016-9320-y.
Van de Giessen M. et al.:"Probabilistic atlas based labeling of the cerebral vessel tree", Event: SPIE Medical Imaging, 2015, Orlando, Florida, United States.
Dunas T. et al.:"Automatic labeling of cerebral arteries in magnetic resonance angiography", Magn Reson Mater Phy (2016) 29:39-47.
Analyse von Gefassstrukturen in medizinischen Schichtdatenslaetzen fur die computergestuetzte Operationsplanung; XP-002508300; Shaker Verlag, Aachen; pp. 2, 5, 43; figure 1.1; Dirk Selle; 2000.
Tetteh G. et al.:"DeepVesselNet: Vessel Segmentation, CenterlinePrediction, and Bifurcation Detection in 3-D Angiographic Volumes".
Peter E Hart, et al., "A Formal Basis for the Heuristic Determination of Minimum Cost Paths", IEEE Transactions on Systems Science and Cybernetics, Jul. 1968, pp. 100-107, vol. SSC-4, No. 2. (8 pages); 1968.

\* cited by examiner

METHOD AND SYSTEM FOR ANALYZING A PLURALITY OF INTERCONNECTED BLOOD VESSELS

PRIORITY STATEMENT

The present application hereby claims priority under 35 U.S.C. § 119 to European patent application number EP 20198496.0 filed Sep. 25, 2020, the entire contents of which are hereby incorporated herein by reference.

FIELD

Example embodiments of the invention generally relate to a method and system for analyzing a plurality of interconnected blood vessels.

Example embodiments of the present invention lie in the field of medical imaging, which is used for creating visual representations of the interior of a body for clinical analysis and medical intervention, as well as visual representation of the function of some organs or tissues. In particular, example embodiments of the present invention lie in the field of blood vessel analysis by medical imaging.

BACKGROUND

Reference is made to the added list of documents at the end of the description of the invention which are herein incorporated by reference and, in the text, are referred to in square parentheses ([1] to [14]).

The diagnosis of ischemic strokes is usually supported by imaging data from Computed Tomography Angiography (CTA), in order to localize intravascular thrombi that can be targeted for a thrombolysis and/or mechanical thrombectomy. The thrombectomy is the physical removal of the clot in an interventional setup. However, the diagnosis of ischemic strokes remains challenging, since the region of interest, the Circle of Willis and its peripheral vessels, the cerebral arteries are surrounded by other vessels and bone structures. The Circle of Willis is the joining area of several arteries at the bottom (inferior) side of the brain. At the Circle of Willis, the internal carotid arteries branch into smaller arteries that supply oxygenated blood to over 80% of the cerebrum. This challenging situation is further complicated by the large number of anatomical variants of the Circle of Willis including the cerebrovascular vessel tree [1]. To know the patient's anatomical nature simplifies the planning for the thrombectomy significantly. Therefore, physicians need to have a good overview of all vessels highlighted by the CTA acquisition.

A 3D segmentation of the cerebrovascular vessel tree provides such overview in a visually intuitive way. Digital Subtraction Angiography (DSA), the subtraction of a registered CTA and non-contrast enhanced CT (NCCT) volume, provides the best segmentation of all vessels. Still, DSA requires in total two acquisitions and hence two radial exposures. Furthermore, DSA visualizes both, veins and arteries which is sometimes not desired either especially if a large contrast bolus was injected, because usually the cerebral arteries are the reason for acute strokes and thus of interest in the actual diagnosis. Especially veins, like the Sinus Sagittal disturb the visual appearance as such vessels are not of interest in the diagnosis. To exclude them for the visualization would ease the diagnosis and simplifies the visualization to the relevant parts. A labeling of the large cerebrovascular vessels together with the prediction of missing or occluded vessels would further accelerate, simplify and increase the accuracy of a stroke diagnosis.

Works on the segmentation with CTA only are quite rare as often a prior NCCT is being incorporated such that both data sets are processed into DSA-like images before they are finally being segmented [2, 3]. Despite the difficulty to work on CTA only, an early feasibility study has shown, a segmentation of the cerebrovascular tree with no additional NCCT is possible [8]. With the use of deep learning methods Nazir et al. proposed 2020 a network performing the segmentation of the cerebrovascular vessel tree [4]. They have proposed a patch-wise segmentation network like a ResNet consisting of Inception Modules trained on in total 70 CTA volumes with manually annotated labels. In a cross-validation setup, they have achieved a Dice score of 89.46%. But as in all supervised deep learning methods, labeled data is essential, and especially for the cerebrovascular vessel tree extremely time consuming to produce. Nazir et al. reported the annotation by hand of one single CTA data set takes five to six hours each and the annotation of 20 data sets takes a month [4], making the development of large-scale applications or the reproducibility very difficult.

Labeling

Atlas based approaches are the most commonly used way of realizing a vessel labeling, e.g. as it was done with TOF MRI data by van de Giessen [5] and with 4D-flow MRI data by Dunas et al. [6] with the corresponding follow up work [7]. In all approaches, the atlas map is being labeled with respect to the vessel sections and after a registration compared to a data set at hand. As these works also cover the computation of the respective atlas maps, only data sets of healthy patients were used, which makes a clinical evaluation hard for ischemic stroke cases. Nonetheless, the methods by Dunas et al. [6,7] can detect vessels missing due to anatomical variants but as no cases with large vessel occlusion were part of their work, no predictions can be done on how their method will perform on stroke cases. Labeling on CTA data compared to MRI data leads to the same challenges as in the segmentation: Bone tissue can easily be confused with perfused vessels and thus disturb the labeling. Therefore, no fair comparisons can be done between the labeling of MRI data against the labeling of CTA data. To the best of our knowledge, no works about the labeling of the cerebral vessels on CTA data only has been done so far.

Path Finding

In order to selectively render parts of the vessel tree, dependent to their distances to some root node, a path search algorithm is required. Path finding algorithms on cerebrovascular vessel trees have been applied for MRI angiography data published by Suran et al. [9]. Suran et al. considered the binary skeleton of a vessel tree as a graph, where each white pixel represents one node of a graph. In order to determine shortest pathways, the Dijkstra Algorithm is applied on the pixel-graph.

SUMMARY

In the above work, the inventors discovered that they only computed single pathways but have not used them further for processing like the mentioned selective rendering. Moreover, the inventors discovered that computing paths on pixel basis, as how they did, is inefficient because the number of recursive calls increases with the number of nodes.

At least one embodiment of the invention provides improved methods and/or systems for analyzing a plurality of interconnected blood vessels.

In the following the solution according to embodiments, the invention is described with respect to systems as well as with respect to methods. Elements, characteristics, advantages or alternative embodiments herein can be assigned to the other claimed objects and vice versa. In other words, claims for the providing systems can be improved with features described or claimed in the context of the methods. In this case, the functional features of the method are embodied by objective units of the providing system. Furthermore, elements, characteristics, advantages or alternative embodiments described in connection with particular example embodiments can be assigned to the invention in its most general terms.

In its most general terms, at least one embodiment of the invention relates to a method, preferably a computer implemented method, for providing output data. The output data comprises a graphical representation of a vessel tree model of a patient. The method of at least one embodiment of the invention, comprises:
  receiving input data, e.g. via a first interface,
  generating output data by applying algorithmic operations to the input data,
  providing the output data, e.g. via a second interface.

In its most general terms, at least one embodiment of the invention further relates to a system, comprising:
  a first interface, configured for receiving input data,
  a second interface, configured for providing output data, and
  a computation unit, configured for applying algorithmic operations to the input data, wherein the output data is generated.

The computation unit or calculation unit may optionally comprise a plurality of calculation units for performing separate algorithmic operations. The plurality of calculation may be provided as independent, connected subunits of the computation unit or, in the alternative, may be provided as one integrated computation unit.

In its most general terms, at least one embodiment of the invention further relates to a computer program comprising instructions which, when the program is executed by a computer cause the computer to carry out the methods of at least one embodiment of invention.

In its most general terms, at least one embodiment of the invention further relates to a computer-readable medium comprising instructions which, when executed by a computer cause the computer to carry out the methods of at least one embodiment of invention.

In particular, at least one embodiment of the invention relates to a method for analyzing a plurality of interconnected blood vessels, comprising:
  receiving a medical image data set, the medical imaging dataset comprising image data of a region of a patient's anatomy including a plurality of interconnected blood vessels, wherein the vessels are labelled with a contrast agent;
  registering tissue structure surrounding the plurality of interconnected blood vessels in the medical image data set with a tissue atlas;
  deriving, from the registration, a transformation field;
  applying the transformation field to register the plurality of blood vessels with a vessel atlas to obtain a plurality of segmented blood vessels and generating a vessel tree model from the plurality of segmented blood vessels using prior anatomical knowledge, wherein the vessel tree model is a graph model comprising nodes and edges; and
  outputting a graphical representation of the vessel tree model.

At least one embodiment of the invention further relates to a system for analyzing a plurality of interconnected blood vessels, comprising:
  a first interface for receiving a medical image data set, the medical imaging dataset comprising image data of a region of a patient's anatomy including a plurality of interconnected blood vessels, wherein the vessels labelled with a contrast agent;
  an image registration unit for registering tissue structure surrounding the plurality of interconnected blood vessels in the medical image data set with a tissue atlas;
  a first calculation unit for deriving a transformation field from the registration;
  a second calculation unit for applying the transformation field to register the plurality of blood vessels with
  a vessel atlas to obtain a plurality of segmented blood vessels and generating a vessel tree model from the plurality of segmented blood vessels using prior anatomical knowledge, wherein the vessel tree model is a graph model comprising nodes and edges; and
  a second interface for outputting a graphical representation of the vessel tree model.

At least one embodiment of the invention further relates to a method for analyzing a plurality of interconnected blood vessels, comprising:
  receiving a medical image data set, the medical imaging dataset including image data of a region of an anatomy of a patient including a plurality of interconnected blood vessels, wherein the plurality of interconnected blood vessels are labelled with a contrast agent;
  registering tissue structure surrounding the plurality of interconnected blood vessels in the medical image data set with a tissue atlas;
  deriving, from the registering, a transformation field;
  applying the transformation field to register the plurality of blood vessels with a vessel atlas to obtain a plurality of segmented blood vessels and generating a vessel tree model from the plurality of segmented blood vessels using prior anatomical knowledge, wherein the vessel tree model is a graph model including nodes and edges; and outputting a graphical representation of the vessel tree model.

At least one embodiment of the invention further relates to a system for analyzing a plurality of interconnected blood vessels, comprising:
  a first interface to receive a medical image data set, the medical imaging dataset including image data of a region of an anatomy of a patient including a plurality of interconnected blood vessels, the plurality of interconnected blood vessels being labelled with a contrast agent;
  an image registration unit to register tissue structure surrounding the plurality of interconnected blood vessels in the medical image data set with a tissue atlas;
  a first calculation unit to derive a transformation field from registration of the tissue structure;
  a second calculation unit to apply the transformation field to register the plurality of interconnected blood vessels with a vessel atlas to obtain a plurality of segmented blood vessels and to generate a vessel tree model from the plurality of segmented blood vessels using prior anatomical knowledge, wherein the vessel tree model is a graph model including nodes and edges; and
  a second interface to output a graphical representation of the vessel tree model.

At least one embodiment of the invention further relates to a non-transitory computer readable storage medium, storing a program to perform the method of an embodiment when executed on a computer device.

At least one embodiment of the invention further relates to a system for analyzing a plurality of interconnected blood vessels, comprising:

at least one interface to receive a medical image data set, the medical imaging dataset including image data of a region of an anatomy of a patient including a plurality of interconnected blood vessels, the plurality of interconnected blood vessels being labelled with a contrast agent; and at least one processor to register tissue structure surrounding the plurality of interconnected blood vessels in the medical image data set with a tissue atlas, derive a transformation field from registration of the tissue structure, apply the transformation field to register the plurality of interconnected blood vessels with a vessel atlas to obtain a plurality of segmented blood vessels and to generate a vessel tree model from the plurality of segmented blood vessels using prior anatomical knowledge, wherein the vessel tree model is a graph model including nodes and edges;

the at least one interface being further configured to output a graphical representation of the vessel tree model.

BRIEF DESCRIPTION OF THE DRAWINGS

Further details and advantages of the current invention can be taken from the following description of example embodiments in conjunction with the drawings in which.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without subdividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor;

however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (procesor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In its most general terms, at least one embodiment of the invention relates to a method, preferably a computer implemented method, for providing output data. The output data comprises a graphical representation of a vessel tree model of a patient. The method of at least one embodiment of the invention, comprises:

receiving input data, e.g. via a first interface,
generating output data by applying algorithmic operations to the input data,
providing the output data, e.g. via a second interface.

In its most general terms, at least one embodiment of the invention further relates to a system, comprising:
- a first interface, configured for receiving input data,
- a second interface, configured for providing output data, and
- a computation unit, configured for applying algorithmic operations to the input data, wherein the output data is generated.

The computation unit or calculation unit may optionally comprise a plurality of calculation units for performing separate algorithmic operations. The plurality of calculation may be provided as independent, connected subunits of the computation unit or, in the alternative, may be provided as one integrated computation unit.

In its most general terms, at least one embodiment of the invention further relates to a computer program comprising instructions which, when the program is executed by a computer cause the computer to carry out the methods of at least one embodiment of invention.

In its most general terms, at least one embodiment of the invention further relates to a computer-readable medium comprising instructions which, when executed by a computer cause the computer to carry out the methods of at least one embodiment of invention.

Most of the aforementioned units, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

The term "unit" may be replaced with the term "circuit" or "module". The term "unit" may refer to, be part of, or include processor hardware (shared, dedicated, or group) that executes code and memory hardware (shared, dedicated, or group) that stores code executed by the processor hardware.

The units may be implemented in one control unit and each unit may include one or more interface circuits. Alternatively, the units may be implemented in a delocalized system, e.g. in a network. In some examples, the interface circuits may include wired or wireless interfaces that are connected to a local area network (LAN), the Internet, a wide area network (WAN), or combinations thereof. The functionality of any given unit of the present disclosure may be distributed among multiple modules that are connected via interface circuits. For example, multiple modules may allow load balancing. In a further example, a server (also known as remote, or cloud) module may accomplish some functionality on behalf of a client module.

In particular, at least one embodiment of the invention relates to a method for analyzing a plurality of interconnected blood vessels, comprising:
- receiving a medical image data set, the medical imaging dataset comprising image data of a region of a patient's anatomy including a plurality of interconnected blood vessels, wherein the vessels are labelled with a contrast agent;
- registering tissue structure surrounding the plurality of interconnected blood vessels in the medical image data set with a tissue atlas;
- deriving, from the registration, a transformation field;
- applying the transformation field to register the plurality of blood vessels with a vessel atlas to obtain a plurality of segmented blood vessels and generating a vessel tree model from the plurality of segmented blood vessels using prior anatomical knowledge, wherein the vessel tree model is a graph model comprising nodes and edges; and
- outputting a graphical representation of the vessel tree model.

At least one embodiment of the inventive method provides a graphical representation of a vessel tree model derived from a the medical imaging dataset comprising image data of a region of a patient's anatomy including a plurality of interconnected blood vessels (also termed "blood vessel tree" or "vessel tree"), This graphical representation is suitable for performing further analyses, as will be discussed below. The medical imaging dataset is obtained from a contrast scan, wherein the vessels are labelled with a contrast agent. Such contrast scan imaging is known in the art.

The method of at least one embodiment of the invention comprises two image registration steps: First, the tissue structure surrounding the plurality of interconnected blood vessels in the medical image data set with a tissue atlas. Such a tissue atlas can be a reference imaging data set which is obtained from another person or a plurality of other persons and represents a "standard" or "reference". It can be obtained with the same imaging modality or a different imaging modality as the medical imaging data set of the patient. The tissue atlas can be annotated, for example with annotations of known anatomic structures. For example, in the case of cerebral vessels, the surrounding brain tissue is registered to a tissue atlas of the brain (also termed "brain atlas"). Such a brain atlas can be constructed from magnetic resonance (MR) images, as is known in the prior art [13]. In order to register the tissue structure surrounding the plurality of interconnected blood vessels in the medical image data set with the tissue atlas, a transformation field is generated. This can be viewed as a data-based or mathematical description of registering the tissue structure with the tissue atlas. This transformation field is then used for the second registration step wherein the plurality of blood vessels with a vessel atlas to obtain a plurality of segmented blood vessels. The vessel atlas can be a reference imaging data set which is obtained from another person or a plurality of other persons and represents a "standard" or "reference". It can be obtained with the same imaging modality or a different imaging modality as the medical imaging data set of the patient. The vessel atlas can be annotated, for example with annotations of known anatomic structures. Based on this second registration step a segmentation of the blood vessels in the medical imaging data set of the patient is achieved.

Based on the segmented blood vessels, a vessel tree model is generated based on a graph model. This graph model comprises nodes and edges. The nodes are representatives of the connection points between vessels or vessel segments in the vessel tree, thus, the nodes comprise information on which vessels or vessel segments are interconnected to which other vessels or vessel segments. The edges are representative of the vessel segments between nodes. The edges may comprise a plurality of feature values which are indicative of further vessel segment features, such as vessel radius, vessel wall thickness, vessel curvature and other features along the vessel segment path.

The vessel tree model is used to generate a graphical representation. Outputting of the graphical representation can be achieved via a dedicated interface and the graphical representation can thus be provided to a display, a printer, a memory, a network or in any other fashion suitable for inspection by a user, storage or further processing.

According to a further embodiment of the method of the invention comprises the steps of selecting a root node in the vessel tree model and determining at least one path of a blood vessel from the root node according to a first optimality criterion, and wherein the first optimality criterion is applied between two nodes or two bifurcations. The root node bay be selected by a user or it may be automatically selected. For this purpose, or any other purpose wherein a selection or input by a user is required, an input interface or input device such as a touch pad, mouse, mouse pad, or the like may be provided.

According to a further embodiment of the method of the invention, at least one path, edge or node is identified from a plurality of paths, edges or nodes, respectively, according to the first optimality criterion (or a further optimality criterion different from the first optimality criterion). The optimality criterion can be selected by a user. Thus, as a non-limiting list of examples, a shortest path between two nodes can be determined, a path with the largest vessel diameter can be determined, a segment with the smallest vessel diameter can be determined, a path with the largest or smallest curvature can be determined and so on. The at least one identified path, edge or node can be marked or highlighted in the graphical representation.

According to a further embodiment, the method of the invention further comprises the step of applying a bone removal algorithm to the medical imaging data set to remove bone structure related data from the imaging data. Various tools and methods for bone removal from medical imaging data sets are known, e.g. [11].

According to a further embodiment of the method of the invention, the graphical representation comprises a subset of the plurality of blood vessels the subset being selected according to a second optimality criterion. The second optimality criterion can be selected by a user. The second optimality criterion can be identical to or different from the first optimality criterion. This allows to selectively highlight or display or hide certain blood vessels in the graphical representation, thus allowing a user to concentrate on a blood vessel or group of blood vessels of interest.

According to a further embodiment of the method of the invention, the first and/or the second optimality criterion and/or any further optimality criterion is selected from the group consisting of shortest path length, the path with the smallest curvature, largest minimal diameter and combinations thereof. Alternatively or additionally any other optimality criterion derivable by the geometric representation of the vessel graph or the medical imaging data set can be used.

According to a further embodiment, the method of the invention further comprises the step of automatically labelling at least one blood vessel of the plurality of interconnected blood vessels with an identifying anatomical label based on prior anatomic knowledge.

According to a further embodiment of the method of the invention, the step of automatically labelling comprises providing a plurality of markers along the path of a blood vessel to be labelled in the vessel atlas and automatically placing a corresponding plurality of markers to the corresponding blood vessel in the vessel tree model, preferably by determining the closest point on a wall of a segmented blood vessel in the vessel tree model. Thereby providing a plurality of markers along the path of a blood vessel to be labelled in the vessel atlas (which in this case comprises labeling information) can be selected to obtain a corresponding labelling in the vessel tree model and/or in the graphical representation.

According to a further embodiment, the method of the invention further comprises detecting a vessel occlusion by determining the distance of a plurality of neighboring markers to the closest point on the wall of a segmented blood vessel in the vessel tree model, wherein an increase, preferably above a selected threshold in distance from one marker to the next in the plurality of neighboring markers is indicative of a vessel occlusion. A plurality of neighboring markers comprises a plurality of markers adjacent to one another along a path of a blood vessel or a blood vessel segment. At the location of a vessel occlusion, the vessel region downstream of the occlusion is no longer detectable in the contrast scan because no contrast agent flows below the point of occlusion. Thus, in an image, the occlusion has the appearance of a "dead end" of a blood vessel. However, in an image showing many different blood vessels, such an occlusion can be overlooked. Taking a plurality of neighboring markers obtained from the vessel atlas, at the location of the occlusion, the distance to the nearest segmented vessel wall pixel or voxel will thus increase for each consecutive marker downstream of the occlusion, as no further vessel wall pixel or voxel is available in the segmentation downstream of the occlusion. This can be used to automatically detect the occlusion.

According to a further embodiment of the method of the invention, the slope of the increase of the distance of a plurality of neighboring markers to the closest point on the wall of a segmented blood vessel in the vessel tree model is determined and a slope above a selected threshold is indicative of a vessel occlusion. Moving downstream from the occlusion the distance to the nearest segmented vessel wall pixel or voxel will thus increase for each consecutive marker downstream of the occlusion. Thus, the distance values can be plotted against the index position of each consecutive marker downstream of the occlusion, wherein the index is 0 for the marker closest to the occlusion, 1 for the next marker downstream, then 2, 3 and so on. Plotting the distance of the markers against the marker index value from 0, 1, 2 . . . n will yield a steadily increasing curve. Performing a linear approximation of the curve will provide an average slope value for the curve. If the slope of a plurality of consecutive markers is around zero, this is indicative of an unoccluded vessel (i.e. the markers are at roughly constant distance to the vessel). If the slope rises above a given threshold, this is indicative of an occlusion. This will be explained in more detail below and in FIG. 6.

At least one embodiment of the invention further relates to a system for analyzing a plurality of interconnected blood vessels, comprising:
  a first interface for receiving a medical image data set, the medical imaging dataset comprising image data of a region of a patient's anatomy including a plurality of interconnected blood vessels, wherein the vessels labelled with a contrast agent;
  an image registration unit for registering tissue structure surrounding the plurality of interconnected blood vessels in the medical image data set with a tissue atlas;
  a first calculation unit for deriving a transformation field from the registration;
  a second calculation unit for applying the transformation field to register the plurality of blood vessels with a vessel atlas to obtain a plurality of segmented blood vessels and generating a vessel tree model from the plurality of segmented blood vessels using prior anatomical knowledge, wherein the vessel tree model is a graph model comprising nodes and edges; and a second interface for outputting a graphical representation of the vessel tree model.

According to a further embodiment of the invention, the system further comprises a third interface for inputting a selection information for selecting a root node in the vessel tree model and a third calculation unit for determining paths from the root node according to a first optimality criterion, and wherein the optimality criterion is applied between two nodes or two bifurcations.

According to a further embodiment of the invention, the system further comprises a labelling unit for automatically labelling at least one blood vessel of the plurality of interconnected blood vessels with an identifying anatomical label based on prior anatomic knowledge.

According to a further embodiment of the invention, the system further comprises a detection unit for detecting a vessel occlusion.

Figure 1:
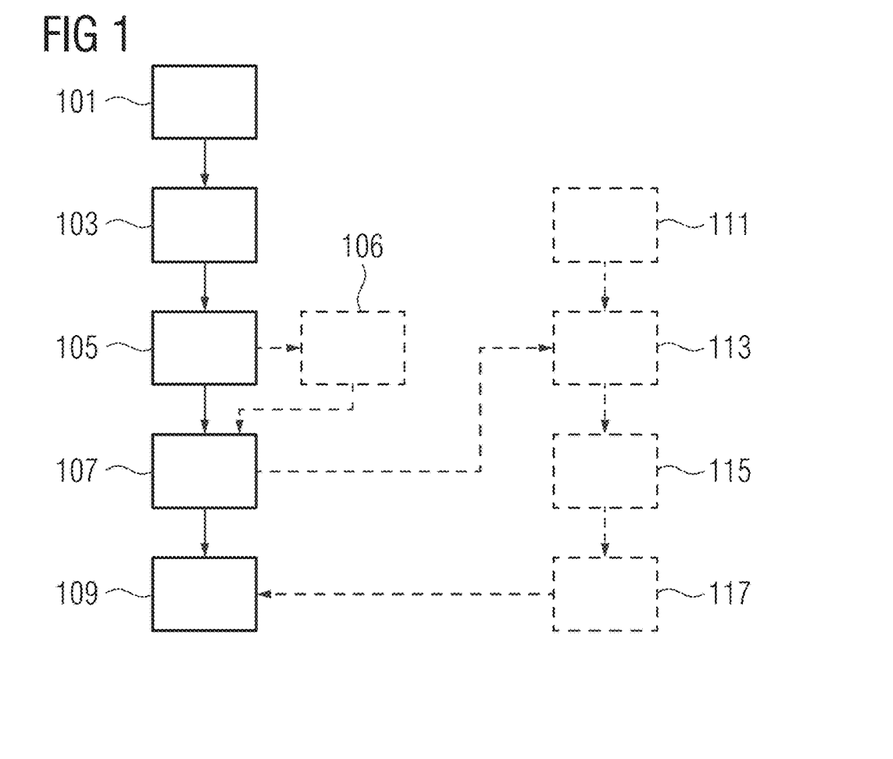
FIG. 1 shows a schematic representation of an embodiment of the method of the invention.

FIG. 1 shows a schematic representation of an embodiment of the method of the invention, comprising the steps of receiving 101 a medical image data set, the medical imaging dataset comprising image data of a region of a patient's anatomy including a plurality of interconnected blood vessels, wherein the vessels are labelled with a contrast agent; registering 103 tissue structure surrounding the plurality of interconnected blood vessels in the medical image data set with a tissue atlas; from the registration 103, deriving a transformation field 105; applying the transformation field 105 to register the plurality of blood vessels with a vessel atlas to obtain a plurality of segmented blood vessels and generating 107 a vessel tree model from the plurality of segmented blood vessels using prior anatomical knowledge, wherein the vessel tree model is a graph model comprising nodes and edges; and outputting 109 a graphical representation of the vessel tree model. Optionally a step of applying 106 a bone removal algorithm to the medical imaging data set to remove bone structure related data from the imaging data can be performed, e.g prior to the step of applying the transformation field 105 to register the plurality of blood vessels with a vessel atlas to obtain a plurality of segmented blood vessels and generating 107 a vessel tree model. In some cases the bone removal step 106 may not be necessary, e.g. when an medical imaging data set is used as input data which allows prior bone removal or differentiation of bone tissue to surrounding tissue, such as a DSA imaging set or a dual energy CT imaging set.

Further and optionally it is possible to select 111, a root node in the vessel tree model and determining 113 at least one path of a blood vessel from the root node according to a first optimality criterion, and wherein the optimality criterion is applied between two nodes or two bifurcations. Selecting a root node 111 can be done manually by a user via an input device or automatically by an algorithmic operation based on a preset selection criterion, such as for example, the first upstream bifurcation location in a vessel tree or any other definable selection criterion. Then, at least one path, edge or node is identified from a plurality of paths, edges or nodes, respectively, according to the optimality criterion.

Further, at least one blood vessel of the plurality of interconnected blood vessels is labelled 115 with an identifying anatomical label based on prior anatomic knowledge. An example method of labelling will be explained further, below. Additionally, and optionally, the method may comprise a step of automatically detecting 117 a vessel occlusion. An example method of labelling will be explained further, below.

Figure 2:
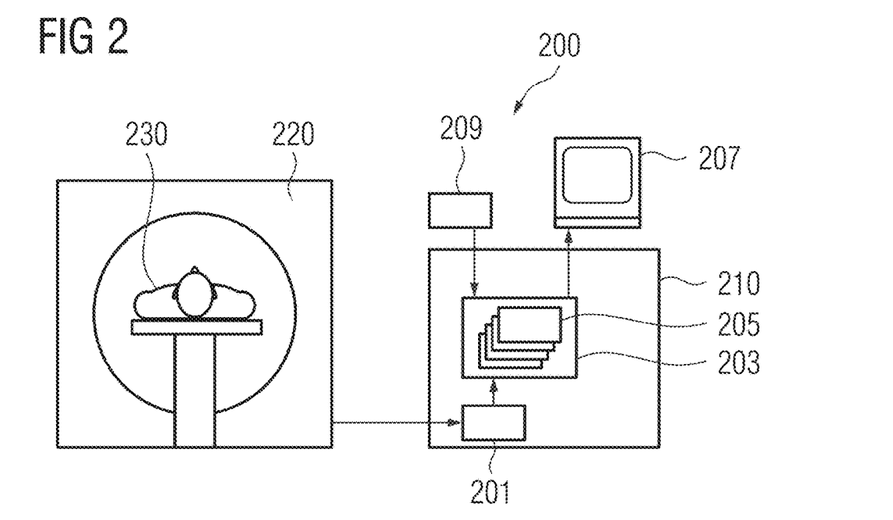
FIG. 2 shows a schematic representation of an embodiment of the system of the invention.

FIG. 2 shows a schematic representation of an example embodiment of the system 200 of the invention. This example embodiment comprises a control unit 210 and a CT scanner 220 for scanning a patient 230. The control unit comprises a first interface 201 for receiving a medical image data set. The control unit 210 further comprises a computation unit 203, which comprises a plurality of further calculation units 205: an image registration unit (not separately depicted in FIG. 2) for registering tissue structure surrounding the plurality of interconnected blood vessels in the medical image data set with a tissue atlas, a first calculation unit for deriving a transformation field from the registration, and a second calculation unit (not separately depicted in FIG. 2) for applying the transformation field to register the plurality of blood vessels with a vessel atlas. Further there is provided a second interface 207 for outputting a graphical representation of the vessel tree model, and a further interface 209 for inputting commands, such as selecting commands, control commands and other commands or data by a user.

Figure 3:
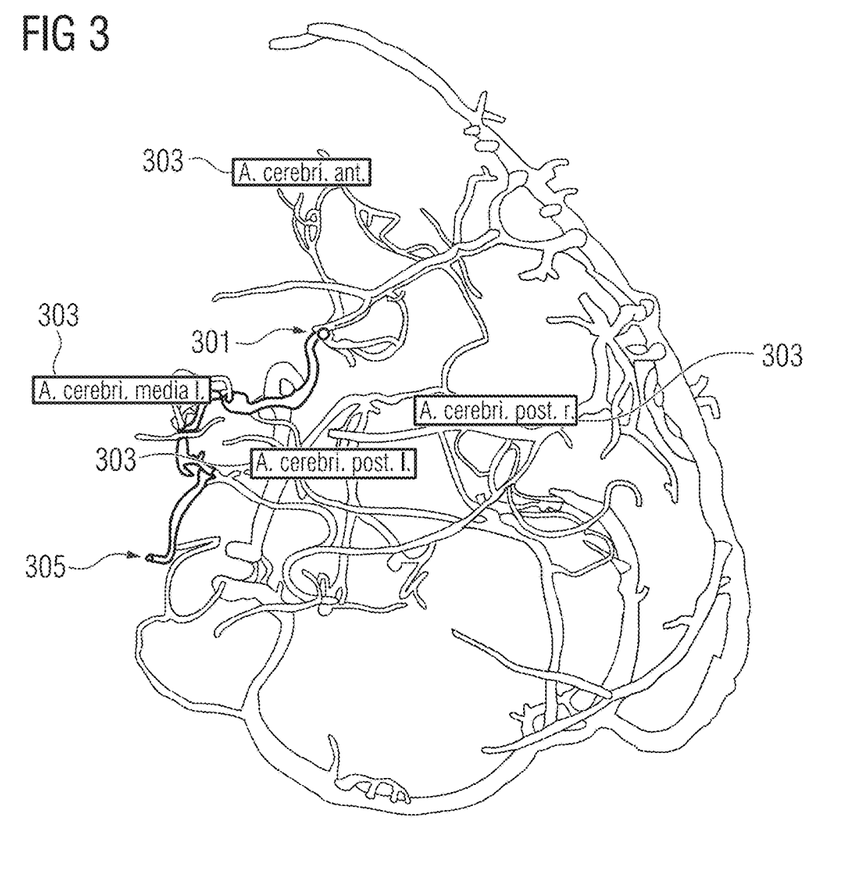
FIG. 3 shows a schematic representation of a graphical representation according to an embodiment of the invention.
Figure 4:
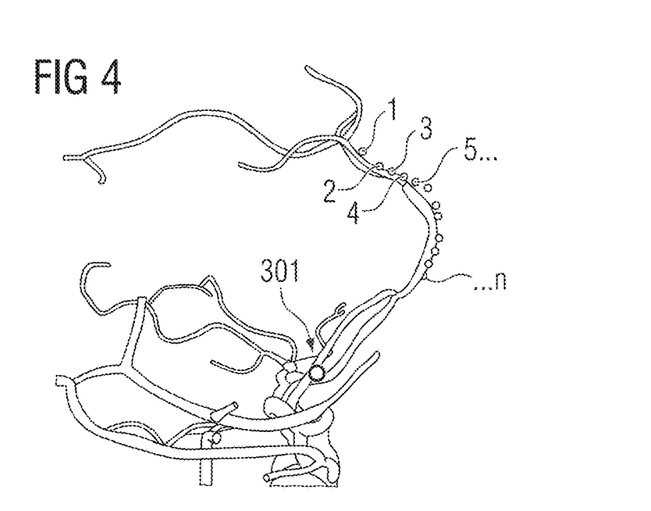
FIG. 4 shows a detail of a schematic representation of a graphical representation according to an embodiment of the invention.

FIG. 3 shows a schematic representation of a graphical representation according to an embodiment of the invention. The graphical representation depicts a blood vessel tree of cerebral blood vessels wherein a user has selected a root node 301 at the Communicans Anterior vessel. The graphical representation comprises labelling information 303 wherein various major cerebral arteries are labelled with their common anatomical label/name. The user has further selected the location 305 to calculate and highlight a shortest path between the root node 301 and the location 305;

FIG. 4 shows a detail of a schematic representation of a graphical representation according to an embodiment of the invention. The graphical representation depicts a blood vessel tree of cerebral blood vessels wherein a user has selected a root node 301 at the Communicans Anterior vessel. Further, various markers 1, 2, 3, 4, 5 . . . n, obtained from a vessel atlas are shown superimposed into the blood vessel tree as a chain of markers following the anterior cerebral artery. These markers 1, 2, 3, 4, 5 . . . n, are known to be associated with the respective blood vessel (namely, in this example, the anterior cerebral artery) from the vessel atlas, and they can be used to identify and label the corresponding blood vessel in the graphical representation.

Figure 5:
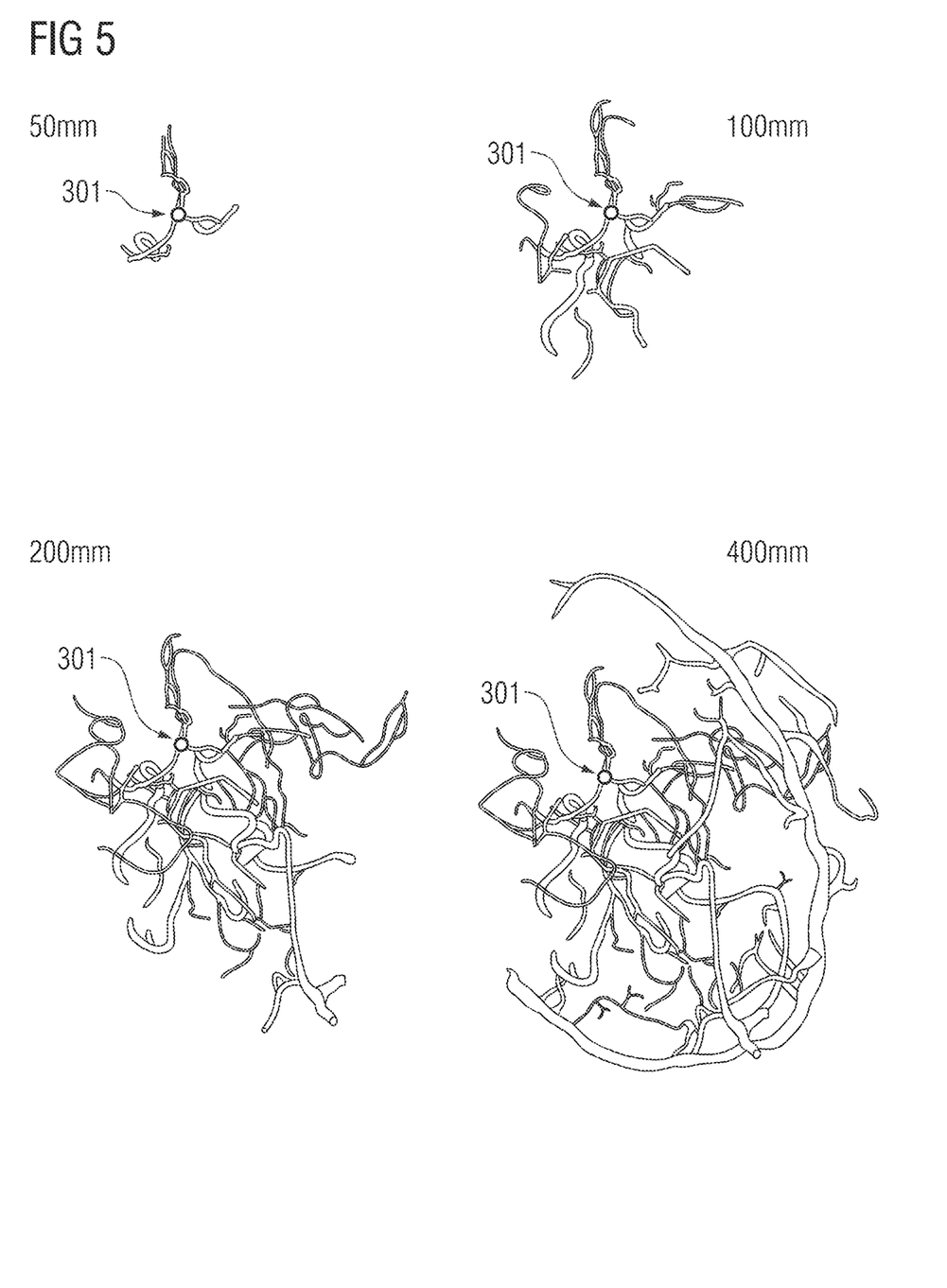
FIG. 5 shows four schematic representations wherein different vessels are hidden depending on a selected path length.

FIG. 5 shows four schematic representations wherein different vessels are hidden depending on a selected path length; The graphical representation depicts a blood vessel tree of cerebral blood vessels wherein a user as selected a root node 301 at the Communicans Anterior vessel. The user has selected path lengths from the root node 301 of 50 mm, 100 mm, 200 mm, and 400 mm. In this graphical representation the user has further selected to hide all blood vessels not connected to the root node and to hide all blood vessels or blood vessel regions having a greater path length than the selected path length from the root node. Thus, vessels that are not connected or further away from the root node are hidden. This helps to reduce the complexity of the graphical representation and to focus on areas of interest. The Communicans Anterior vessel indicates the root node 301. 50 mm shows vessels directly connected to the root node 301. With 100 mm the Circle of Willis is entirely shown together with close parts of the Cerebral Arteries. 200 mm includes all Cerebral Vessels in their full length. 400 mm shows all vessels found including parts not of interest in the ischemic stroke diagnosis, e.g. Sinus Sagittalis.

Figure 6:
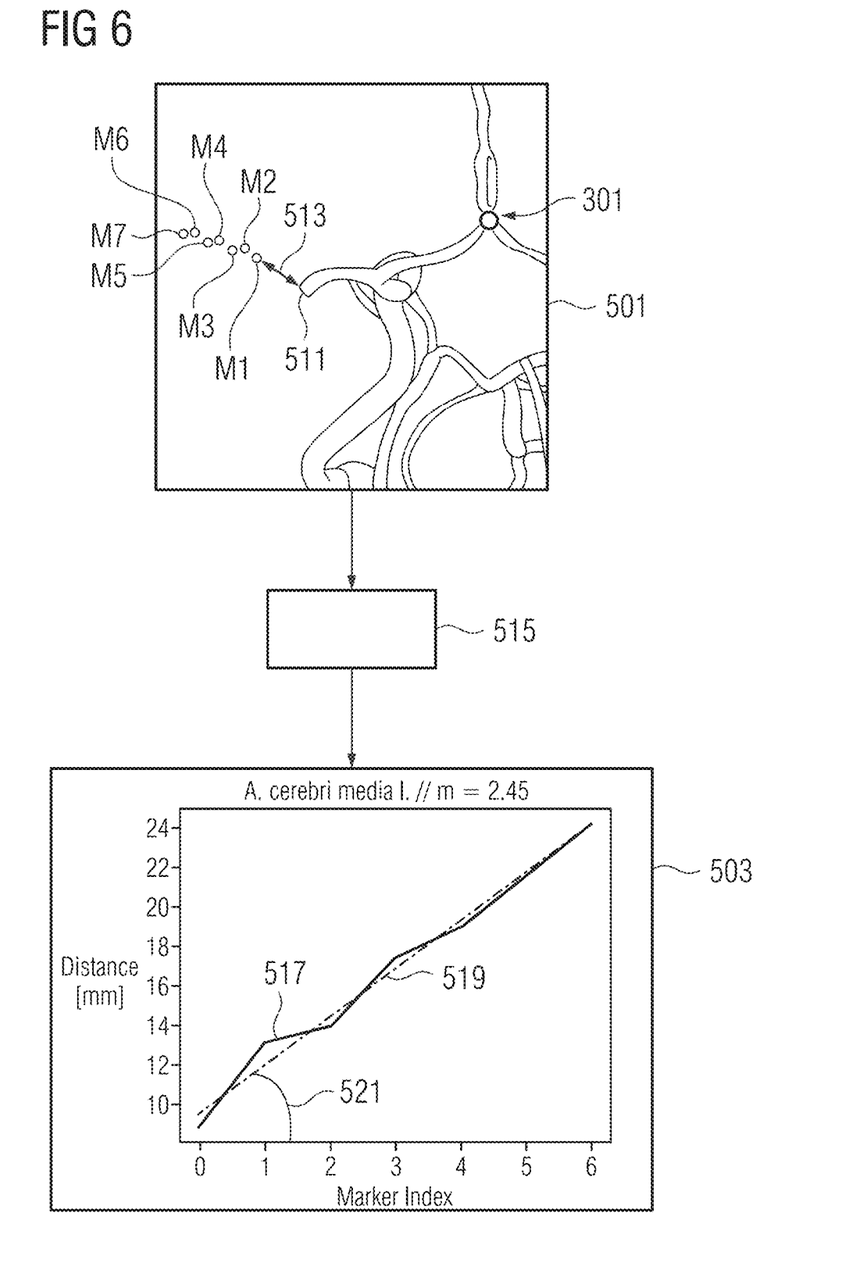
FIG. 6 shows a schematic representation of a method of detection of a vessel occlusion according to an embodiment of a method of the invention.

FIG. 6 shows a schematic illustration of a method of detection of a vessel occlusion according to a method of an embodiment of the invention, including a detail 501 of a graphical representation of a vessel tree and a graph 503 wherein a distance value is plotted against a marker index.

In the detail 501 of the graphical representation, the Circle of Willis 301 has been selected as a root node 301 by a user. Further, one of the blood vessels shown has an occlusion 511. At the occlusion 511, the segmentation of the blood vessel is disrupted and there are no further segmented blood vessel pixels or voxels downstream of the occlusion 511. A plurality of neighboring markers M1 to M7, obtained from a vessel tree atlas each have a distance 513 to the nearest blood vessel pixel or voxel at the occlusion 511. Moving downstream from the occlusion 511 the distance 513 to the nearest segmented blood vessel wall pixel or voxel will thus increase for each consecutive marker M1 to M7 downstream of the occlusion. Thus, as shown in the graph 503, through a series of computation steps 515, the distance are determined from the graphical representation data and the distance values can be plotted against the index position of each consecutive marker downstream of the occlusion, wherein the index is 0 for the marker M1 closest to the occlusion 511, 1 for the next marker M2 downstream, and so on until index 6 for the marker M7. Plotting the distance of the markers M1 to M7 against the marker index value from 0 to 6 will yield a steadily increasing curve 517. Performing a linear approximation 519 of the curve will provide an average slope value 521 for the curve. If the slope 521 of a plurality of consecutive markers is around zero, this is indicative of an unoccluded vessel (i.e. the markers are at roughly constant distance to the vessel). If the slope rises above a given threshold, this is indicative of an occlusion.

Herein disclosed are several inventive embodiments and aspects. The first inventive embodiment arises from the application of search algorithms on a vessel model of the cerebrovascular tree, further also described in the subsection "Search on Models", below. The second inventive embodiment covers the labeling of the large cerebral vessels and as further inventive embodiment the subsequent detection of occlusion enabled by the labeling, described in the subsection "Occlusion Detection", below.

These inventive embodiments and aspects are based on an image processing pipeline which leads to a fully automated segmentation of the cerebrovascular vessel tree enabled by the use of a brain atlas (e.g., [13]) and a vessel atlas (e.g., [14]) and, optionally, by a bone removal tool (e.g., [11]). The pipeline reacts particularly well on vessels with a diameter typical for the cerebrovascular tree. The resulting vessel tree segmentation is modelled using the Dtf-skeletonization algorithm by Selle [10] implemented in MeVisLab.

Search on Models

The vessel tree model can be used as an algorithmic interface. The vessel tree model can be used to apply path search algorithms and with that many applications arise. The search is based on bifurcation level instead of on pixel basis, as bifurcations are relevant for any path decisions, which accelerates the algorithm significantly and allows an interactive use of it. The vessel tree model itself is equivalent to a graph where all bifurcations represent nodes and vessel sections represent edges. In an initial state, the user or the automated labeling, sets a so-called root node. The root node represents the node where all nodes paths are computed to. For example, the so-called A* Algorithm [14] can be used in order to compute the paths according to some optimality criterion between the root node to all other nodes in the tree and caches internally all resulting paths to provide quick access. For instance, the optimality criterion might be the shortest walking distance or the largest achievable vessel diameter between two nodes. If the iteration is done, the following information are available for each node:

The sequence of nodes, describing the path to the root node according to the optimization criterion.
The optimality value, e.g. the path length of the shortest path found or smallest diameter which occurs in the broadest path found (min-max problem).
The direction of each edge attached to the node according the optimality criterion.

Moreover, trees which are not attached to the tree related to the root node can be rendered and be considered into the path search as well. Depending on the choice of the optimality criterion this is possible by the computation of most optimal node in these unattached trees. These quasi-optimal nodes are treated again as root nodes within their own tree.

From the three properties above certain application and algorithms can be derived, which are listed in the following:

Path Search: The plain path search results can be used to be rendered as an overlay to the model itself. FIG. 2 shows the example for the pathfinding according the smallest distance rendered in blue. This feature can be used to guide an interventional action. E.g. the CTA volume can be rendered with the shortest path between two nodes or the path which guarantees a minimal diameter large enough for a certain catheter.

Vessel Suppression: Due to the second property certain nodes, hence vessel section can be shown or concealed interactively according to the optimality criterion. For example, the ischemic stroke diagnosis becomes easier, if the root node is placed into the Circle of Willis, and the vein structures (Sinus Sagittalis) which are not of interest in the actual diagnosis are concealed, because they have large distances to the root node. In this case we call it Vein Suppression, shown in FIG. 1, as veins are hidden in the first place. Another use case would be to render only vessels, which have a smallest diameter on their path from the root node large enough to fit for certain catheter diameter.

Abnormality Detection: Rapid changes in the edge direction might be indicators for anatomical abnormalities. For instance, if the diameter optimality has been chosen, and two connected edges, point into two opposite directions, a stenosis might be located close to the respective node. Another example using the distance optimality would be to compute to search models with two different root node, one in the Circle of Willis and another in the Sinus Sagittalis, AVMs or AV-Fistulas are detectable as well, when the same node shows comparable small distances and distances in the same range to both root nodes.

Labeling and Occlusion Detection

As mentioned earlier, the segmentation pipeline utilizes both a brain atlas and a vessel atlas. For example, one usable labeling method is enabled by placing multiple markers on the vessel atlas for each large vessel. After a registration of the brain atlas, these vessel markers are transformed into the CTA dataset at hand. FIG. 4 shows the multiple markers placed on the Anterior Cerebral Artery. To finally place a label to the corresponding vessels, our approach determines the closest point on the vessel segmentation wall to each marker and choses the one with the smallest distance as the final marker. Either the marker itself or the closest point on the vessel can be used as label position. The label markers found by this approach can be used to set automatic root nodes for the Abnormality Detection or the Vessel Suppression mentioned before.

The labeling concept is extended by the proposal of a method to use the markers as indicators for occluded vessels. To this end, the proposed approach computes the distances of each marker to the closest vessel wall. If an occlusion is located next to the markers and thus the vessel model interrupts, all markers have a common closest point on the vessel wall (i.e. at the vessel endpoint at the occlusion). This leads to a linear increase of the distance measure with ascending marker index. FIG. 6 shows this behavior on a dataset with an occlusion in the Middle Cerebral Artery and the corresponding linear increase in distance. A linear regression allows to compute the slope of the linear relation. Subsequently, the slope itself serves as an indicator for the occlusion. If the slope is small, the marker chain is placed rather parallel to the vessel direction. If the slope is large and positive, the marker chain diverges from the closest vessel point, thus an interruption in the vessel flow is to be expected. If the slope is negative, the marker chain approaches the vessel wall with ascending index, which can be caused by inaccuracies in the registration and are not considered as an indicator for abnormalities.

Advantages which arise from that are listed below:

This approach does neither necessarily need 4D-CTA data (CTP) nor any prior NCCT scan and e.g. allows segmentation solely based on CTA data in contrast to many other works targeting the segmentation of the cerebrovascular tree. This avoids additional X-Ray exposure and increases the diagnosis speed as less actions are required.

No labeled data is required as the methods of the invention rely on an image processing pipeline combined with algorithms as the path search.

Further, the methods of an embodiment of the invention provide automated labelling and annotation of vessels. For example Nazir et al. report that the annotation by hand of all cerebral vessels in one single CTA data set takes five to six hours each and the annotation of 20 data sets takes a month [4] which shows the avoidance of manual labelling and annotation data provides a clear advantage. The proposed methods of the invention provides the first image processing chain, which does neither require labeled data nor any further CT acquisition beyond a CTA.

The interactive Vessel Suppression as e.g. described in connection with FIG. 3 provides a useful tool to better understand the dataset at hand in a shorter time, by reducing the shown vessels to the relevant ones. As different optimization targets can be chosen, different application cases can be derived by that. The Vein Suppression (shortest distance optimization) in particular can be achieved by the specific acquisition of the arterial phase.

A multi-timepoint CTA acquisition or a CTP acquisition are alternatives, where the arterial phase can be selected in the postprocessing. Compared to our approach, more than one exposure is required, so our method is hence the preferred way.

Related works [9] have used Dijkstra for the distance optimized path search, but we chose the A*-search algorithm [14] combined with an optimal heuristic (e.g. the Euclidean Distance for the shortest path optimization criterion) as our choice leads faster to optimal pathways. Both algorithms lead to the same results, but A* is considerably faster due to the use of a proper heuristic while still guaranteeing an optimal path (see optimality criterions for heuristic functions which guarantee optimality).

Related works [9] applied the path search on pixel basis, here, instead, the algorithm is applied on bifurcation level, which considerably increases the performance. This allows an interactive use case of the search without any high-end hardware.

In related works no considerations were made about the case, when vessel trees are not connected to the main tree.

We have extended our algorithm accordingly. No small unattached trees get lost in the diagnosis. This turns out to be useful especially if occlusions interrupt a vessel.

REFERENCES

[1]: Iqbal, S. "A comprehensive study of the anatomical variations of the circle of Willis in adult human brains." Journal of clinical and diagnostic research: JCDR 7.11 (2013): 2423.

[2]: Hernandez, Monica, and Alejandro F. Frangi. "Nonparametric geodesic active regions: Method and evaluation for cerebral aneurysms segmentation in 3DRA and CTA." Medical image analysis 11.3 (2007): 224-241.

[3]: Manniesing, Rashindra, et al. "Level set based cerebral vasculature segmentation and diameter quantification in CT angiography." Medical image analysis 10.2 (2006): 200-214.

[4]: Nazir, Anam, et al. "OFF-eNET: An Optimally Fused Fully End-to-End Network for Automatic Dense Volumetric 3D Intracranial Blood Vessels Segmentation." IEEE Transactions on Image Processing (2020).

[5]: Van de Giessen, Martijn, et al. "Probabilistic atlas based labeling of the cerebral vessel tree." Medical Imaging 2015: Image Processing. Vol. 9413. International Society for Optics and Photonics, 2015.

[6]: Dunås, Tora, et al. "Automatic labeling of cerebral arteries in magnetic resonance angiography." Magnetic Resonance Materials in Physics, Biology and Medicine 29.1 (2016): 39-47.

[7]: Dunås, Tora, et al. "A stereotactic probabilistic atlas for the major cerebral arteries." Neuroinformatics 15.1 (2017): 101-110.

[8]: Manniesing, Rashindra, et al. "Cerebral arteries: Fully automated segmentation from CT angiography—a feasibility study." Radiology 247.3 (2008): 841-846.

[9]: Suran, Shweta, Vishwajeet Pattanaik, and D. Malathi. "Discovering shortest path between points in cerebrovascular system." Proceedings of the 6th IBM Collaborative Academia Research Exchange Conference (I-CARE) on I-CARE 2014. 2014, the entire contents of which are incorporated herein by reference.

[10]: Selle, Dirk. Analyse von Gefäßstrukturen in medizinischen Schichtdatensätzen für die comutergestützte Operationsplanung. Shaker, 2000, the entire contents of which are incorporated herein by reference.

[11]: Chen, Mingqing, et al. "Deep learning based bone removal in computed tomography angiography." U.S. Pat. No. 10,582,907. 10 Mar. 2020, the entire contents of which are incorporated herein by reference.

[12]: Kemmling, A., et al. "Decomposing the Hounsfield unit." Clinical neuroradiology 22.1 (2012): 79-91, the entire contents of which are incorporated herein by reference.

[13]: Forkert, Nils Daniel, et al. "Generation of a probabilistic arterial cerebrovascular atlas derived from 700 time of-flight MRA datasets." MIE. 2012, the entire contents of which are incorporated herein by reference.

[14]: Hart, E. Peter et al. "A Formal Basis for the Heuristic Determination of Minimum Cost Paths" IEEE Transactions on Systems Science and Cybernetics. 1968, the entire contents of which are incorporated herein by reference.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
   registering a tissue structure with a tissue atlas to obtain a transformation field, the tissue structure surrounding a plurality of interconnected blood vessels in a medical image data set, the medical imaging dataset including image data of a region of an anatomy of a patient, and the image data including the plurality of interconnected blood vessels labelled with a contrast agent;
   registering the plurality of interconnected blood vessels with a vessel atlas by applying the transformation field to obtain a plurality of segmented blood vessels;
   generating a vessel tree model from the plurality of segmented blood vessels using prior anatomical knowledge, the vessel tree model being a graph model including nodes and edges, and the nodes and edges representing the plurality of segmented blood vessels;
   determining at least one path of a first blood vessel from a selected root node; and
   outputting a graphical representation of the vessel tree model, the graphical representation including the at least one path of the first blood vessel.

2. The method of claim 1, further comprising:
   selecting the selected root node in the vessel tree model, wherein the determining the at least one path is performed according to a first criterion, the first blood vessel being among the plurality of interconnected vessels, and the first criterion being applied between two nodes or two bifurcations.

3. The method of claim 2, wherein the determining the at least one path comprises identifying the at least one path from among a plurality of paths, at least one edge from among a plurality of edges or at least one node from among a plurality of nodes according to the first criterion.

4. The method of claim 3, further comprising:
   applying a bone removal algorithm to the medical imaging data set to remove bone structure related data from the imaging data.

5. The method of claim 2, wherein the graphical representation includes a subset of the plurality of interconnected blood vessels, the subset being selected according to a second criterion.

6. The method of claim 5, further comprising
   selecting at least one of the first criterion or the second criterion to include a shortest path length, a path with a smallest curvature or a largest minimal diameter.

7. The method of claim 2, further comprising:
   applying a bone removal algorithm to the medical imaging data set to remove bone structure related data from the imaging data.

8. The method of claim 2, further comprising:
   automatically labelling at least one blood vessel of among the plurality of interconnected blood vessels, with an identifying anatomical label based on prior anatomic knowledge.

9. The method of claim 8, wherein the automatically labelling comprises:
   providing a first plurality of markers along a path of a second blood vessel in the vessel atlas; and
   automatically placing a second plurality of markers to a third blood vessel in the vessel tree model, the first plurality of markers corresponding to the second plurality of markers, and the second blood vessel corresponding to the third blood vessel.

10. The method of claim 1, further comprising:
    applying a bone removal algorithm to the medical imaging data set to remove bone structure related data from the imaging data.

11. The method of claim 1, further comprising:
    automatically labelling at least one blood vessel among the plurality of interconnected blood vessels, with an identifying anatomical label based on prior anatomic knowledge.

12. The method of claim 11, wherein the automatically labelling comprises:
    providing a first plurality of markers along a path of a second blood vessel in the vessel atlas; and
    automatically placing a second plurality of markers to a third blood vessel in the vessel tree model, the first plurality of markers corresponding to the second plurality of markers, and the second blood vessel corresponding to the third blood vessel.

13. The method of claim 12, wherein
    the automatically placing of the second plurality of markers includes determining a closest point on a wall of a fourth blood vessel in the vessel tree model; and
    the method further comprises detecting a vessel occlusion by determining respective distances of a plurality of neighboring markers to the closest point on the wall of the fourth blood vessel, the detecting of the vessel occlusion includes detecting an increase above a selected threshold based on the respective distances, and the plurality of neighboring markers being among the second plurality of markers.

14. The method of claim 13, further comprising:
determining a slope of the increase of the respective distances,
wherein the detecting of the vessel occlusion includes detecting that the slope is above the selected threshold.

15. The method of claim 12, wherein the automatically placing of the second plurality of markers includes determining a closest point on a wall of a fourth blood vessel in the vessel tree model.

16. A non-transitory computer readable storage medium storing a program that, when executed on a computer devices, causes the computer device to perform the method of claim 1.

17. A system, comprising:
an image registration unit to register a tissue structure with a tissue atlas to obtain a transformation field, the tissue structure surrounding a plurality of interconnected blood vessels in a medical image data set, the medical imaging dataset including image data of a region of an anatomy of a patient, and the image data including the plurality of interconnected blood vessels labelled with a contrast agent;
a first calculation unit to
register the plurality of interconnected blood vessels with a vessel atlas by applying the transformation field to obtain a plurality of segmented blood vessels, and
generate a vessel tree model from the plurality of segmented blood vessels using prior anatomical knowledge, the vessel tree model being a graph model including nodes and edges, and the nodes and edges representing the plurality of segmented blood vessels;
a second calculation unit to determine at least one path of a first blood vessel from a selected root node; and
a first interface to output a graphical representation of the vessel tree model, the graphical representation including the at least one path of the first blood vessel.

18. The system of claim 17, further comprising:
a second interface to input selection information for selecting the selected root node in the vessel tree model,
wherein the second calculation unit is to determine the at least one paths according to a first criterion, the first criterion being applied between two nodes or two bifurcations.

19. The system of claim 18, further comprising:
a labelling unit to automatically label at least one blood vessel among the plurality of interconnected blood vessels with an identifying anatomical label based on prior anatomic knowledge.

20. The system of claim 18, further comprising:
a detection unit to detect a vessel occlusion.

21. The system of claim 17, further comprising:
a labelling unit to automatically label at least one blood vessel among the plurality of interconnected blood vessels with an identifying anatomical label based on prior anatomic knowledge.

22. The system of claim 17, further comprising:
a detection unit to detect a vessel occlusion.

23. A system, comprising:
at least one processor to
register a tissue structure with a tissue atlas to obtain a transformation field, the tissue structure surrounding a plurality of interconnected blood vessels in a medical image data set, the medical imaging dataset including image data of a region of an anatomy of a patient, and the image data including the plurality of interconnected blood vessels labelled with a contrast agent,
register the plurality of interconnected blood vessels with a vessel atlas by applying the transformation field to obtain a plurality of segmented blood vessels,
generate a vessel tree model from the plurality of segmented blood vessels using prior anatomical knowledge, the vessel tree model is-being a graph model including nodes and edges, and the nodes and edges representing the plurality of segmented blood vessels, and
determine at least one path of a first blood vessel from a selected root node; and
at least one interface to output a graphical representation of the vessel tree model, the graphical representation including the at least one path of the first blood vessel.

24. The system of claim 23, wherein
the at least one interface is to input selection information for selecting the selected root node in the vessel tree model; and
the at least one processor is to determine at least one paths according to a first criterion, the first criterion being applied between two nodes or two bifurcations.

* * * * *